(12) United States Patent
Provitola

(10) Patent No.: US 6,250,355 B1
(45) Date of Patent: Jun. 26, 2001

(54) WHEEL AND TIRE STRUCTURE

(76) Inventor: Anthony Italo Provitola, P.O. Box 2855, DeLand, FL (US) 32721-2855

( * ) Notice: Subject to any disclaimer, the term of this patent is extended or adjusted under 35 U.S.C. 154(b) by 0 days.

(21) Appl. No.: 09/314,516

(22) Filed: May 19, 1999

(51) Int. Cl.[7] .................................................. B60C 7/00
(52) U.S. Cl. ............................................................ 152/285
(58) Field of Search .............................. 152/1, 5, 14, 87, 152/92, 284, 285, 287, 73, 276, 13, 11, 12; 301/5.1

(56) References Cited

U.S. PATENT DOCUMENTS

| | | | |
|---|---|---|---|
| 686,901 | * 11/1901 | Lieberthal | 152/276 |
| 705,768 | * 7/1902 | Lieberthal | 152/276 |
| 854,655 | * 5/1907 | Krell | 152/284 |
| 907,906 | * 12/1908 | Specht | 152/276 |
| 919,826 | * 4/1909 | Clausen | 152/284 |
| 1,001,715 | * 8/1911 | Wall | 152/284 |
| 1,120,801 | * 12/1914 | Ernst | 152/276 |
| 1,416,253 | * 5/1922 | Bobek | 152/284 |
| 1,610,238 | * 12/1926 | Benson | 152/276 |
| 1,710,215 | * 4/1929 | Horvath | 152/284 |
| 5,115,852 | 5/1992 | De Lorean . | |
| 5,312,165 | 5/1994 | Spletter . | |
| 5,353,853 | 10/1994 | Hansson . | |
| 5,383,715 | 1/1995 | Homma . | |

\* cited by examiner

Primary Examiner—S. Joseph Morano
Assistant Examiner—Long Bao Nguyen

(57) ABSTRACT

A wheel and tire structure formed by an array of a plurality of connected toroidal support components, which are self-supporting toroidal frameworks of connected torsion elements. The resulting wheel and tire structure may be used as an insert in a tire, incorporated directly in the structure of a tire body, or connected to a central hub structure to form a complete wheel. The open interior of the toroidal tube of the wheel and tire structure also permits inclusion of other types of toroidal structures within the toroidal tube which can assist its function.

20 Claims, 9 Drawing Sheets

WHEEL AND TIRE STRUCTURE

CROSS-REFERENCE TO RELATED APPLICATIONS

U.S. patent application Ser. Nos. 09/276,665 and 09/276,666.

BACKGROUND OF THE INVENTION

The present invention is a wheel and tire structure which includes one or more resilient toroidal support components which are self-supporting toroidal frameworks of connected torsion elements: by attachment to a central hub structure as a complete wheel; or with connecting elements as a tire support structure.

Wheel structures with radial spring elements are generally referred to as "spring-wheels" in the United States classification system, being defined therein under class/subclass 152/1 as a wheel "for land vehicles whereby the vehicle is resiliently supported on the roadway by means within the wheel structure other than a resilient tire." Therefore, the present invention has elements that are covered generally by class 152, resilient tires and wheels, and may be considered under the subclasses 1–13 covering spring wheels and subclasses 516–520 covering "run-flat" devices. Among the patents covered under subclasses 1–13 is the Supporting Wheel, U.S. Pat. No. 5,353,853, which uses "S" shaped springs as the radial elements which support the central hub of the wheel. That device does not involve the use of radial elements which are toroidal, nor does it contemplate a role as a tire insert or as incorporated in the body or carcass of a tire.

BRIEF SUMMARY OF THE INVENTION

The present invention is a wheel and tire structure including one or more resilient toroidal support components which are self-supporting toroidal frameworks of connected torsion elements. A plurality of such toroidal support components are connected in an array to form a wheel with a central hub, or a tire support structure. In a preferred embodiment the toroidal support components may be arranged in a generally radial orientation in the formation of the toroidal shape of the wheel and tire structure. The wheel and tire structure may be used as an insert in a tire, incorporated directly in the structure of the tire body or carcass, or connected to a central hub structure for receiving an axle to form a complete wheel structure.

Although the present invention may provide a non-pneumatic wheel and tire structure, it may also be used in conjunction with pneumatic, fluid filled, or other cushion components.

An object of the invention is to provide non-pneumatic support for a wheel, as part of a non-pneumatic tire or as part of the wheel itself. Such a wheel and tire structure may be assisted with other pneumatic, fluidic, or mechanical means within the toroidal tube of the wheel and tire structure.

DETAILED DESCRIPTION OF THE INVENTION

Figure 1:
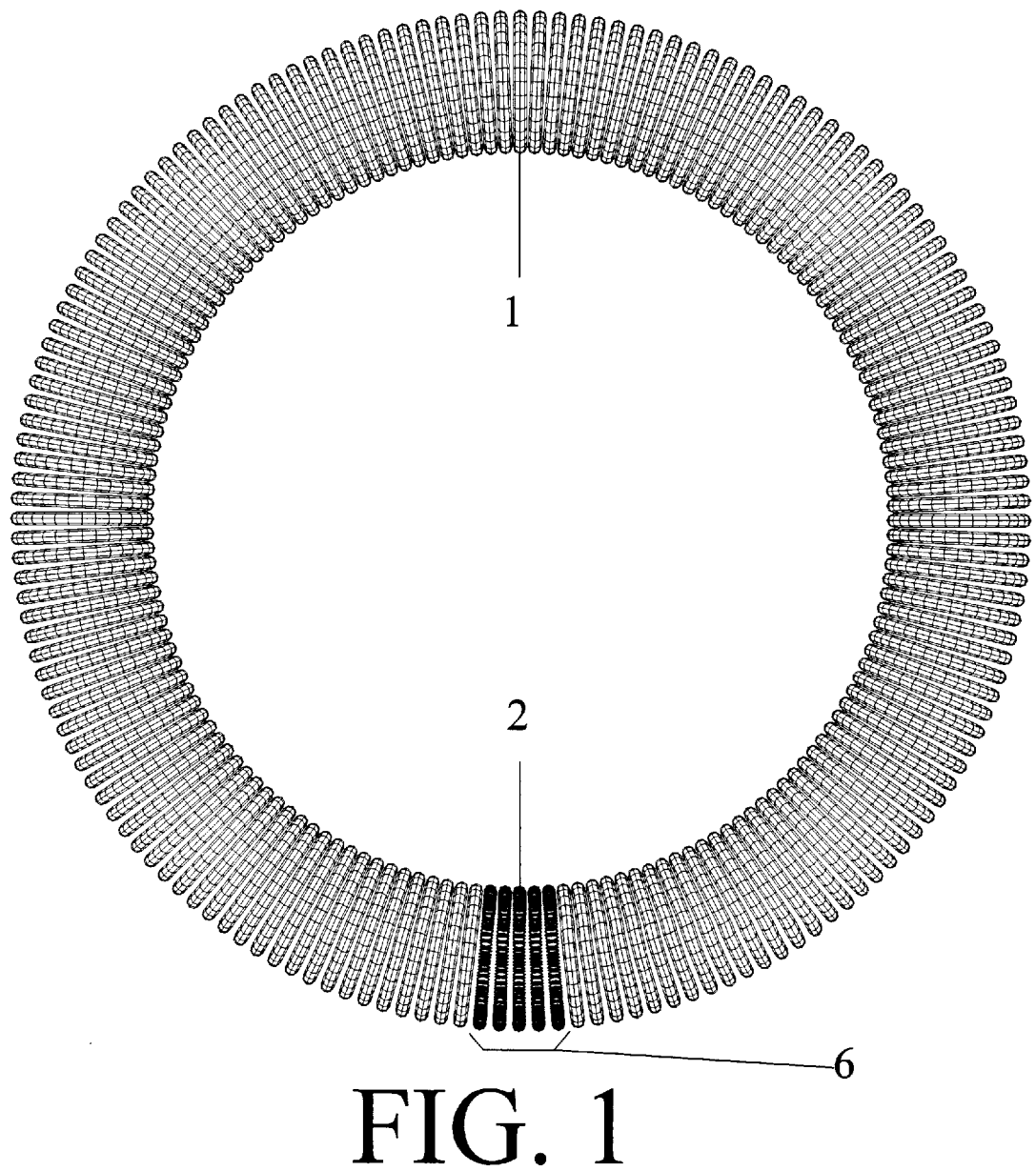
FIG. 1 is aside view of an array of toroidal support components for the wheel and tire structure (the lowest five components of which are shown in detail with the rest of the components being shown diagrammatically).
Figure 2:
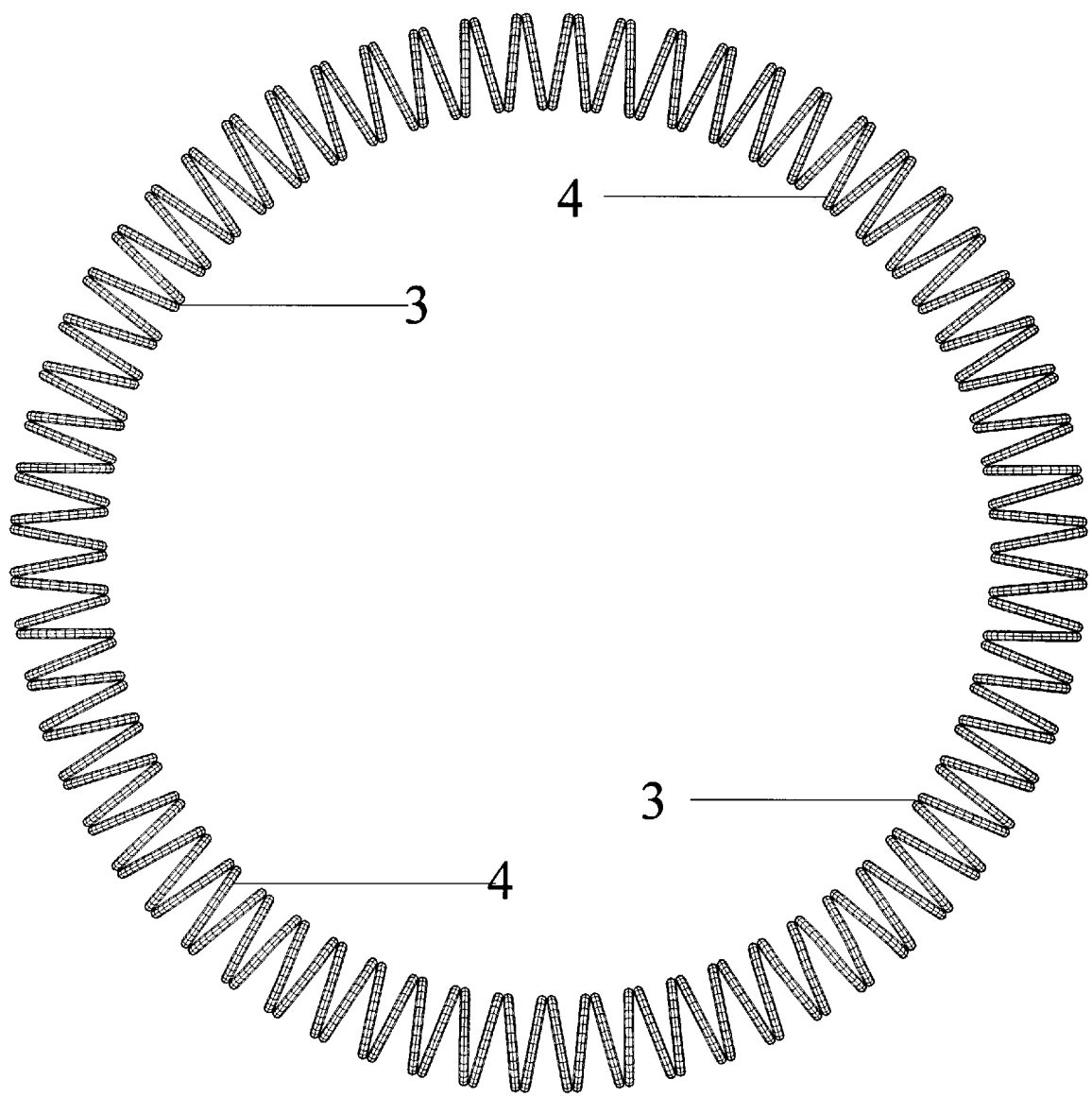
FIG. 2 is a side view of a toroidal support component which is a framework of connected torsion elements.
Figure 3:
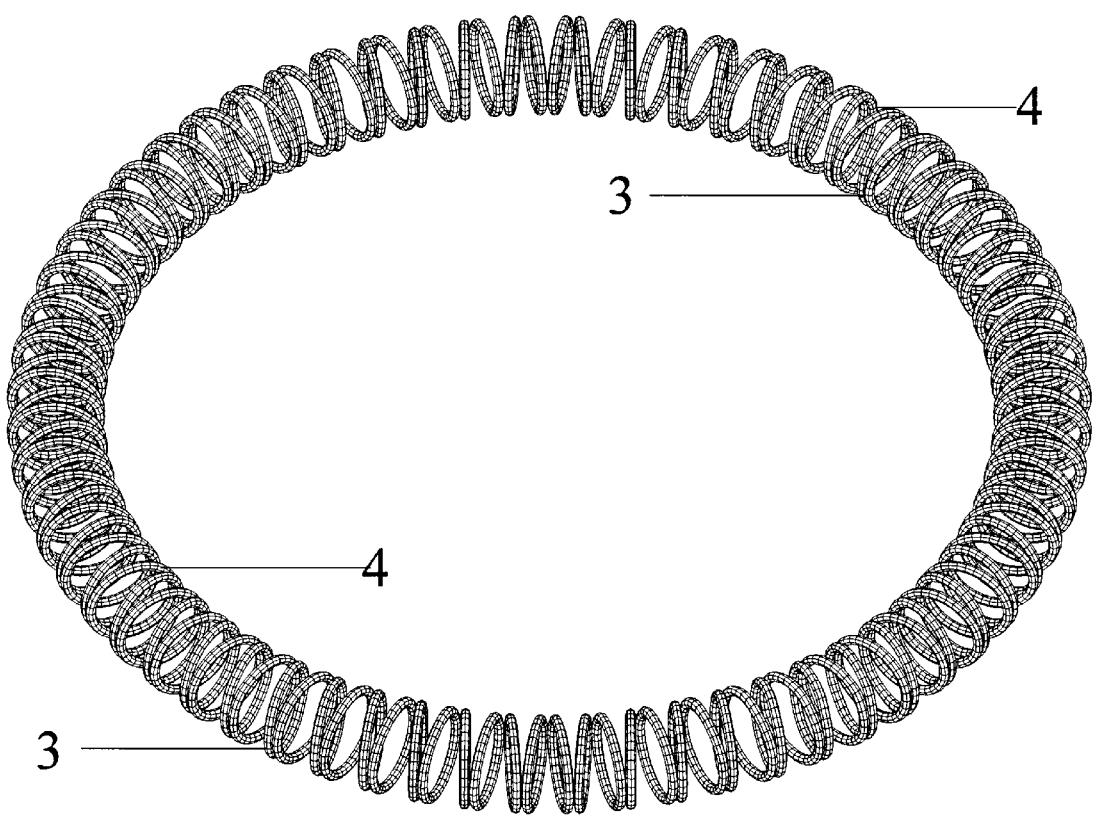
FIG. 3 is a perspective view of the toroidal support component shown in FIG. 2.
Figure 9:
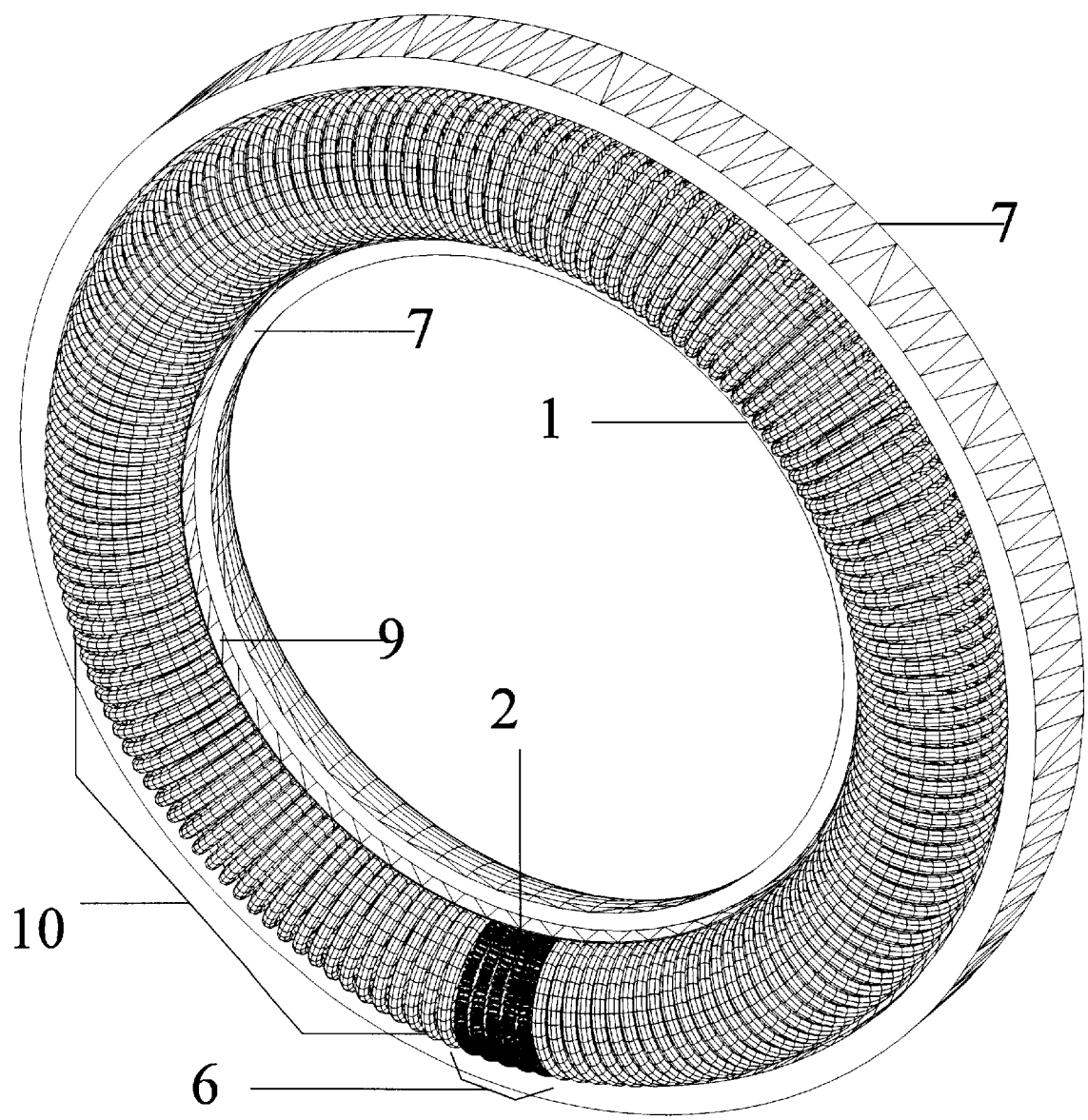
FIG. 9 is a perspective view of a tire with the wheel and tire structure shown in FIG. 7 installed.
Figure 10:
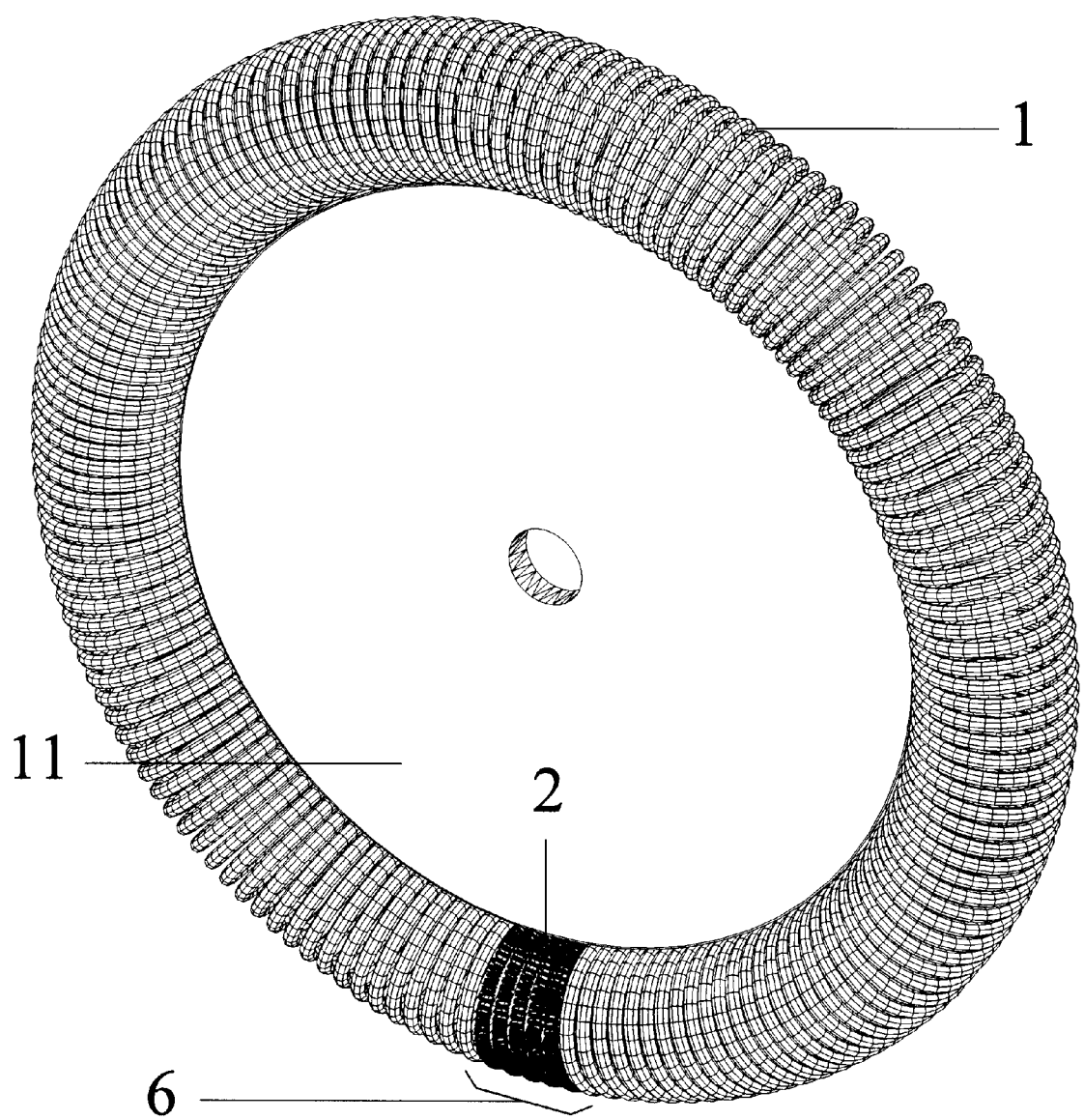
FIG. 10 is a perspective view of a wheel and tire structure shown in FIG. 1 supported by a central hub.
Figure 11:
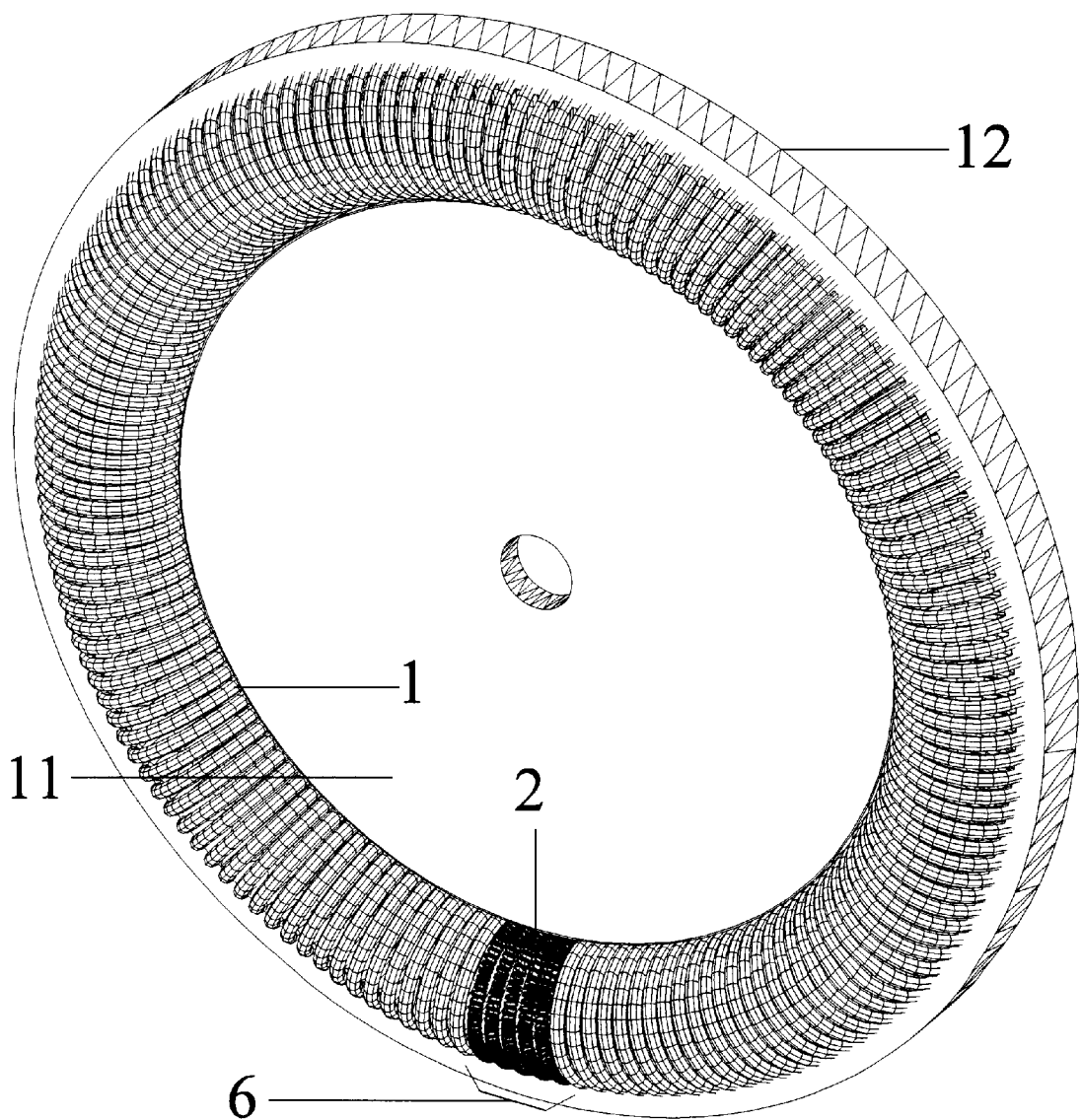
FIG. 11 is a perspective view of a wheel and tire structure shown in FIG. 10 to which a outer wheel rim is connected.

The present invention is a wheel and tire structure that includes one or more resilient toroidal support components which are self-supporting toroidal frameworks of connected torsion elements. A plurality of such toroidal support components may be connected in an array to form a toroidal shape, as exemplified in FIG. 1, where the toroidal support components are arranged in a generally radial orientation in the formation of the wheel and tire structure. FIG. 1 is an array of such toroidal support components 1 including torsion framework components 2, a resilient self-supporting toroidal support component which is a toroidal framework of connected 3 torsion elements 4 as shown in FIGS. 2 and 3. A toroidal support component which is such a framework of connected 3 torsion elements 4 may hereinafter be referred to as a torsion framework component 2. The preferred embodiments of the wheel and tire structure are a wheel with a central hub, as shown in FIGS. 10 and 11, and a tire support structure, as shown in FIGS. 4–9. The torsion framework components 2 of the array may be connected in the wheel and tire structure with other toroidal support components, such as elastomeric solid or tubular toroids, and even complex torioidal support components having their own structure.

An object of the invention is to provide non-pneumatic support for a wheel, as part of a non-pneumatic tire or as part of the wheel itself. Such a wheel and tire structure may assist or be assisted with other pneumatic, fluidic, or mechanical means within the toroidal tube of the wheel and tire structure.

The toroidal support components 1 connected to form the wheel and tire structure shown in FIG. 1 should be elastically deformable to cushion the load carried. Such toroidal support components 1 which are torsion framework components 2, as shown in FIGS. 2 and 3, are depicted in FIG. 1 as the bottom 5 support elements 6. FIG. 1 is not intended to specify any particular combination of toroidal support components 1 by the placement of the torsion framework components 2 as the bottom 5 toroidal support components 6; such placement is only for purposes of illustration, and not exemplary of a combination of various types of toroidal support components. However, many combinations of various types of toroidal support components 1 are contemplated depending on the use to which the wheel and tire structure is put.

Figure 4:
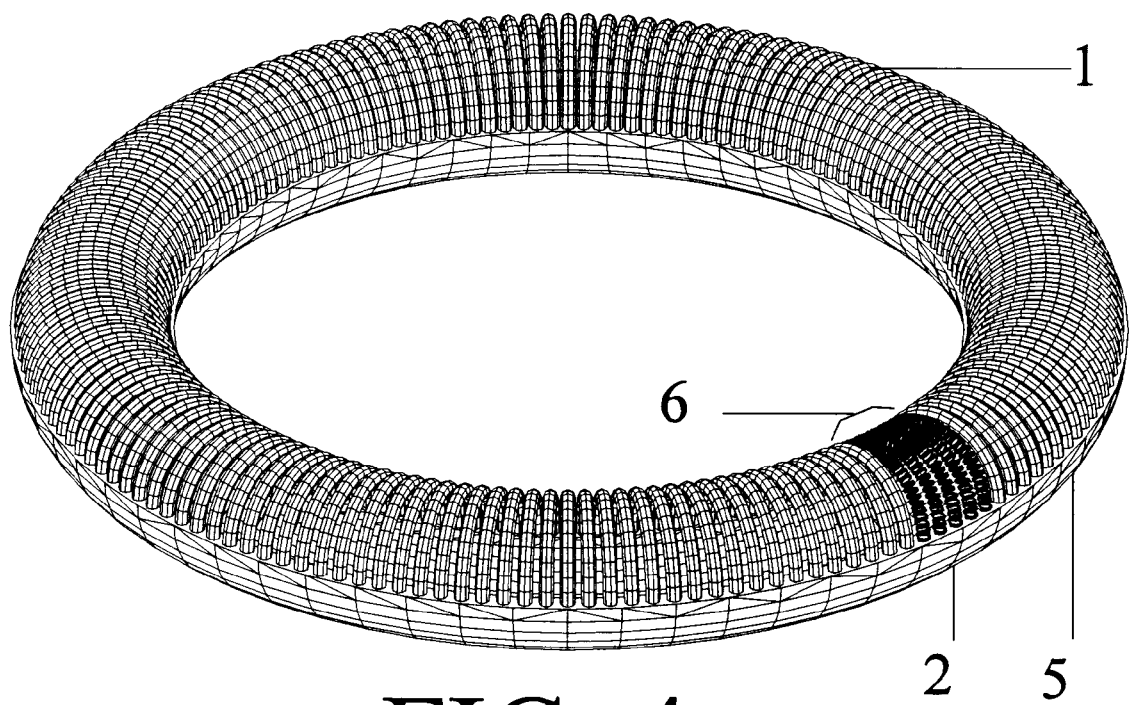
FIG. 4 is a cutaway of a perspective view of the wheel and tire structure shown in FIG. 1 embedded in a matrix.
Figure 5:
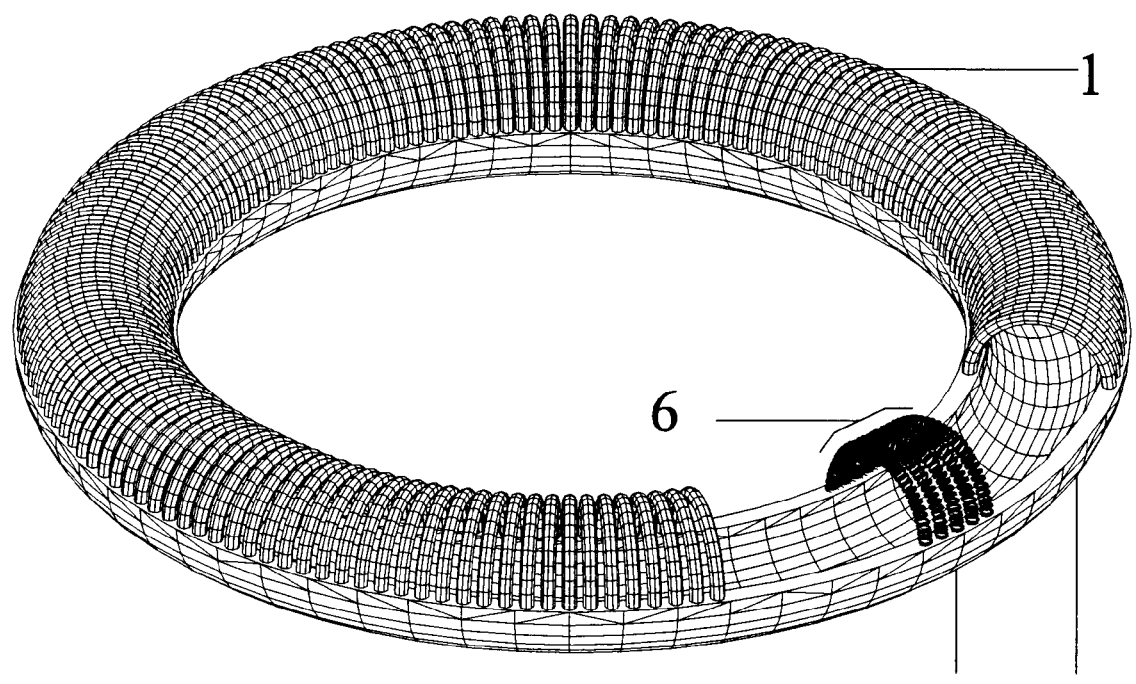
FIG. 5 is the view of the wheel and tire structure shown in FIG. 4 with the 10 toroidal support components next closest on both sides of the lowest five toroidal support components removed.

The torsion framework component 2 shown in FIGS. 2 and 3 is an application of the structural system which is the subject of and disclosed in U.S. patent application Ser. No. 09/276,666, Structural System of Torsion Elements and Method of Construction Therewith. application Ser. No. 09/276,666 discloses a "structural system which employs 'torsion elements' which are connected to form structures" of which a "principle of the invention is the transmission of torsional loads by the connection of 'torsion elements'", the term "torsion element" meaning "a structural element that functions with torsion as its principal load bearing mode". As stated in that Application "torsion elements use the torsional strength of materials and have the capacity to bear the torsion loads distributed to them by the connections of the structural system of which they are a part". Also as stated in that Application "torsion elements may be connected by any means that does not permit unwanted movement in the connection" and "may be any type of joining, such as welding, gluing, fusing, or with the use of fasteners, such as pins, screws and clamps". The toroidal support components 1 may be connected in the array directly as taught in said application Ser. No. 09/276,666, or indirectly connected by being embedded in a common matrix of resilient structural foam or elastomeric material 5, as shown in FIGS. 4 and 5. FIG. 5 is intended to illustrate the embedding of torsion framework components 2 in the matrix 5 by diagrammatically isolating them, and is not exemplary of a spacing of toroidal support components 1.

Figure 6:
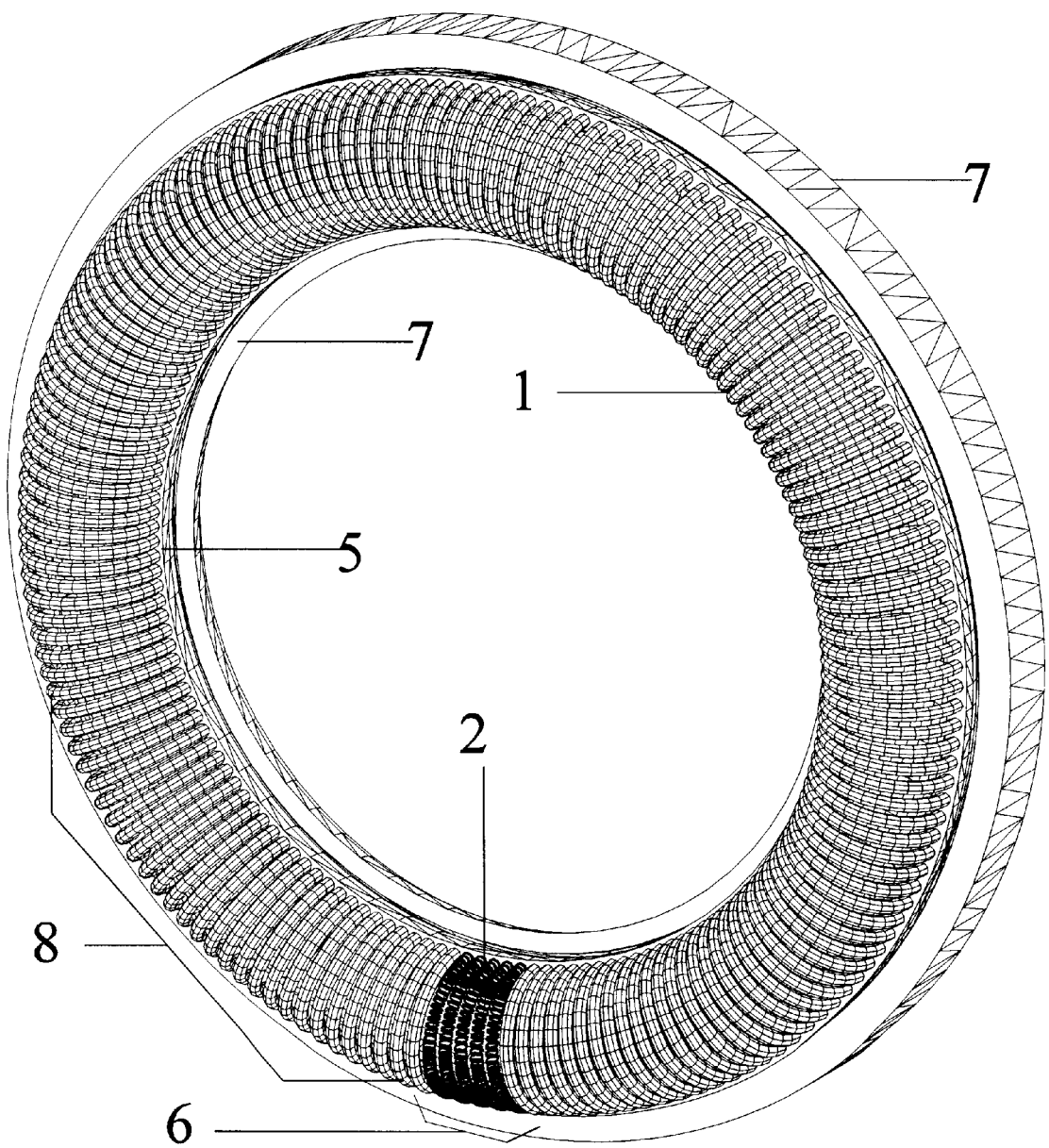
FIG. 6 is a perspective view of a tire with the wheel and tire structure shown in FIG. 4 installed.

As shown in FIG. 6 the wheel and tire structure 8 of FIG. 4 may be used as a tire support structure inserted in but separate from a tire body 7. Also, the wheel and tire structure 8 may be incorporated directly into the structure of the tire body 7, just as if the tire support structure 8 and the tire body 7 were fused together.

Figure 7:
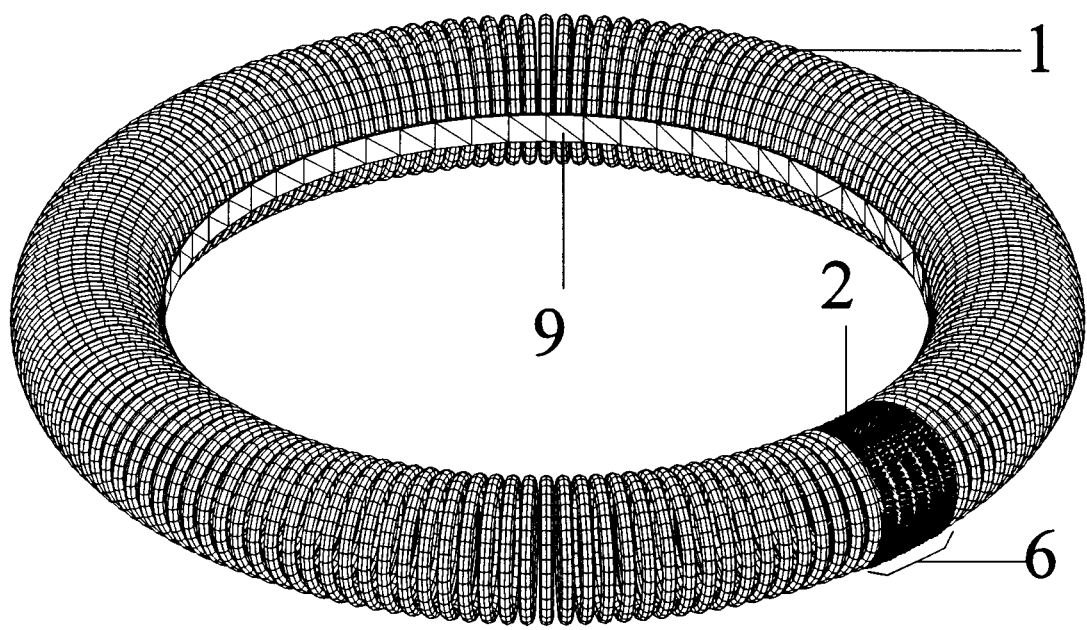
FIG. 7 is a perspective view of the wheel and tire structure shown in FIG. 1 supported by a common band.
Figure 8:
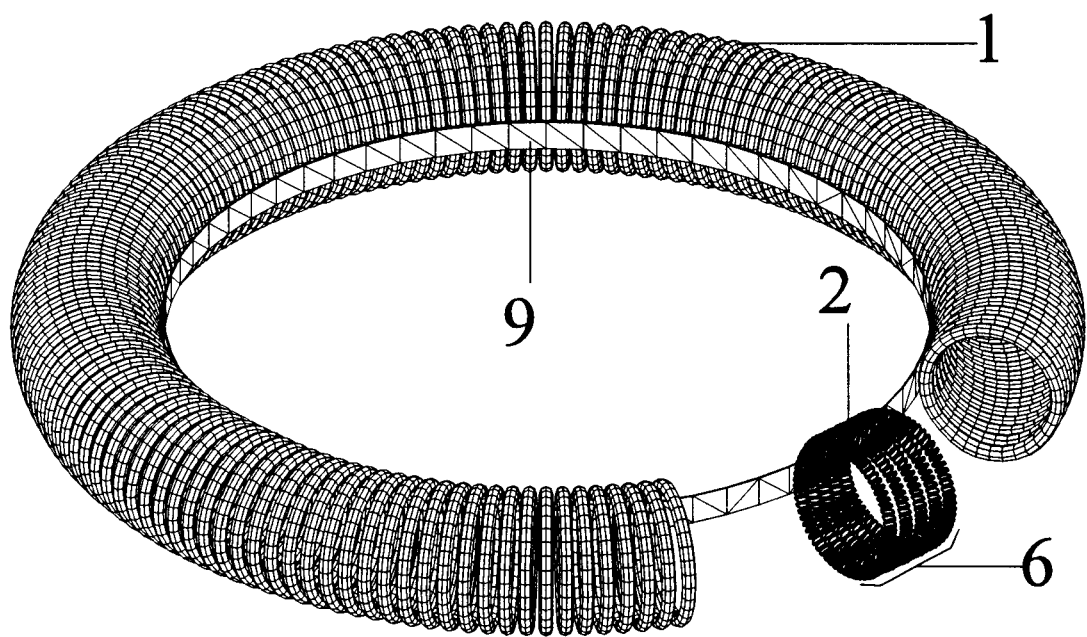
FIG. 8 is the view of the wheel and tire structure shown in FIG. 7 with the 10 toroidal support components next closest on both sides of the lowest five toroidal support components removed.

The toroidal support components 1 may also be connected to form the wheel and tire structure shown in FIG. 1 by attachment to a common band 9, as shown in FIGS. 7 and 8. FIG. 8 is intended to illustrate the connection of torsion framework components 2 to a common band 9 by diagrammatically isolating them, as with FIG. 5, and is not exemplary of a spacing of toroidal support components 1 contemplated to be used in the construction of the wheel and tire structure. Similar to the use shown in FIG. 6, the wheel and tire structure 10 shown in FIG. 7 may be used as a tire support structure by insertion in a tire body 7, as shown in FIG. 9, and may be incorporated directly into the structure of the tire body 7.

Connection of the wheel and tire structure of FIG. 1 to a central hub structure 11 for receiving an axle forms a wheel structure, as shown in FIG. 10. With the addition of an outer wheel rim 12 providing connection of the outer parts of the toroidal support components 1 of the wheel structure, as shown in FIG. 11, a complete wheel is formed with a contact surface on which the wheel structure is intended to roll.

Although the present invention provides a non-pneumatic wheel and tire support structure, other cushion toriodal support components, such as those which are pneumatic or fluid-filled may be included in the array of the wheel and tire structure as toroidal support components. Moreover, the open interior of the toroidal tube of the wheel and tire structure also permits the inclusion of other types of toroidal structures within the toroidal tube to allow for other applications of the wheel and tire structure. Many of these toroidal structures are disclosed and taught in application Ser. Nos. 09/276,665 and 09/276,666.

While the invention has been disclosed in connection with a preferred embodiment, it will be understood that there is no intention to limit the invention to the particular embodiment shown, but it is intended to cover the various alternative and equivalent constructions included within the spirit and scope of the appended claims.

What is claimed is:

1. A wheel and tire structure comprising:
    a plurality of torsion framework components comprising:
        (a) a plurality of torsion elements which function with torsion as the principal load bearing mode; and
        (b) means for connecting the torsion elements so that the torsional load on one of the torsion elements is transmitted to one or more of the other of the torsion elements to which said one of the torsion elements is connected;
    said torsion framework components being connected in an array to form a toroidal shape; and
    a means for connecting said torsion framework components so that loading of the wheel and tire structure loads the torsion framework components.

2. The wheel and tire structure of claim 1 wherein the torsion framework components are embedded in a common matrix of resilient elastomeric material.

3. The wheel and tire structure of claim 1 wherein the torsion framework components are attached to a common band within the hole of such toroidal array.

4. The wheel and tire structure of claim 1 wherein the torsion framework components are attached to a central hub structure within the hole of such toroidal array.

5. The wheel and tire structure of claim 1, further comprising one or more toroidal support components which are not torsion framework components, said one or more toroidal support components being connected in said array with said torsion framework components.

6. The wheel and tire structure of claim 5, further comprising a means for connecting said one or more toroidal support components with said torsion framework components so that loading of the wheel and tire structure loads said one or more toroidal support components.

7. The wheel and tire structure of claim 5 wherein said one or more toroidal support components are embedded in a common matrix of resilient elastomeric material together with said torsion framework components.

8. The wheel and tire structure of claim 5 wherein said one or more toroidal support components are attached to a common band together with said torsion framework components.

9. The wheel and tire structure of claim 5 wherein said one or more toroidal support components are attached to a central hub structure together with said torsion framework components.

10. A wheel and tire structure, comprising: a plurality of toroidal support components, one or more of which is a resilient self-supporting toroidal framework of connected torsion elements, further comprising:
    (a) a plurality of torsion elements which function with torsion as the principal load bearing mode; and
    (b) means for connecting the torsion elements so that the torsional load on one of the torsion elements is transmitted to one or more of the other of the torsion elements to which said one of the torsion elements is connected;
    and a means for connecting the toroidal support components in an array to form a toroidal shape.

11. The wheel and tire structure of claim 10 wherein the means for connecting said toroidal support components is such that loading of the wheel and tire structure loads the toroidal support components.

12. The wheel and tire structure of claim 10 wherein each toroidal support component is embedded in a common matrix of resilient elastomeric material.

13. The wheel and tire structure of claim 10 wherein each toroidal support component is embedded in a common matrix of resilient elastomeric material so that loading of the wheel and tire structure loads the toroidal support components.

14. The wheel and tire structure of claim 10 wherein each toroidal support component is attached to a common band.

15. The wheel and tire structure of claim 14 wherein the common band is within the hole of such toroidal array.

16. The wheel and tire structure of claim 10 wherein each toroidal support component is attached to a common band so that loading of the wheel and tire structure loads the toroidal support components.

17. The wheel and tire structure of claim 10 wherein each toroidal support component is attached to a central hub structure.

18. The wheel and tire structure of claim 17 wherein the central hub structure is within the hole of such toroidal array.

19. The wheel and tire structure of claim 10 wherein each toroidal support component is attached to a central hub so that loading of the wheel and tire structure loads the toroidal support components.

20. In a wheel and tire structure comprised of a toroid-forming array of connected radial toroidal support components, a radial toroidal support component comprising a resilient self-supporting toroidal framework of connected torsion elements comprising:

(a) a plurality of torsion elements which function with torsion as the principal load bearing mode; and (b) means for connecting the torsion elements so that the torsional load on one of the torsion elements is transmitted to one or more of the other of the torsion elements to which said one of the torsion elements is connected.

* * * * *